United States Patent [19]
Pratt et al.

[11] Patent Number: 5,312,665
[45] Date of Patent: May 17, 1994

[54] BIODEGRADABLE LOOSE-FILL PACKING MATERIAL

[75] Inventors: Earl F. Pratt; Gary W. Apel, both of Yakima; Kevin D. Jorgensen, Selah, all of Wash.

[73] Assignee: Michelsen Packaging Company, Yakima, Wash.

[21] Appl. No.: 932,994

[22] Filed: Aug. 20, 1992

[51] Int. Cl.⁵ .................... B65D 81/12; B32B 1/08
[52] U.S. Cl. .................... 428/402; 206/584; 206/814; 493/967; 428/34.3; 428/906
[58] Field of Search ............ 428/98, 402, 194, 906, 428/34.3; 206/584, 814; 493/967; 239/33

[56] References Cited

U.S. PATENT DOCUMENTS

| | | | |
|---|---|---|---|
| 585,057 | 6/1897 | Stone | 239/33 |
| 3,047,136 | 7/1962 | Graham | 206/46 |
| 3,074,543 | 1/1963 | Stanley | 206/46 |
| 3,481,455 | 12/1969 | Graham et al. | 206/46 |
| 3,855,053 | 12/1974 | Fuss | 161/168 |
| 3,961,000 | 6/1976 | Ropiequet | 264/45.5 |
| 4,621,022 | 11/1986 | Kohaut et al. | 428/397 |

*Primary Examiner*—Alexander S. Thomas
*Attorney, Agent, or Firm*—Wells, St. John, Roberts, Gregory & Matkin

[57] ABSTRACT

The specification discloses a loose-fill packing material comprising a plurality of individual packing elements, and a method of making such packing elements. Each packing element comprises at least two paper rings which are connected to each other at their outer surfaces. Each ring comprises a strip of paper which is rolled lengthwise upon itself. The rolls are fabricated by rolling sheets of paper to form elongated paper rolls having cylindrical outer surfaces and by then attaching pairs of elongated paper rolls together at their outer surfaces along their lengths. Individual packing elements are then cut from the pairs of elongated paper rolls.

18 Claims, 4 Drawing Sheets

5,312,665

BIODEGRADABLE LOOSE-FILL PACKING MATERIAL

TECHNICAL FIELD

This invention relates to biodegradable loose-fill packing materials.

BACKGROUND OF THE INVENTION

Conventional methods of packing often include surrounding an object within a packing container by a quantity of loose-fill packing material. Loose-fill packing material is generally a pourable material which is stored in a large overhead container or hopper and directed into packing containers by a flexible chute. Once in place around an object, the material provides sufficient support to resist migration of the object within the packing container. Probably the most important characteristic of a loose-fill packing material is its ability to repeatedly absorb impact energy without being permanently deformed or crushed. Loose-fill packing material must also be relatively light to minimize shipping costs.

The most convenient and commonly used loose-fill packing material has been expanded polystyrene, often referred to as synthetic "popcorn." Expanded polystyrene and other such foam-type materials are light, provide a high degree of impact energy absorption, and are easily and conveniently formed in a variety of shapes.

However, expanded polystyrene and many polystyrene substitutes also have a significant disadvantage in that they are not biodegradable. As concern has increased over waste disposal and its impact on the environment, this disadvantage has gained considerable social and economic importance.

A number of alternative, biodegradable packing materials have been suggested. One of the most interesting of these alternatives is actual popped corn kernels. Unfortunately, the biodegradable alternatives have generally been unacceptable. The primary shortcoming of many such packing materials is their lack of sufficient impact energy absorption. Many packing materials also fail to prevent migration of objects within a packing container or to provide sufficient support for the objects. Such materials are also often costly, relatively heavy, and are difficult or inconvenient to work with.

BRIEF DESCRIPTION OF THE DRAWINGS

Preferred embodiments of the invention are described below with reference to the accompanying drawings, in which.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

The invention described below provides an economical alternative to expanded polystyrene packing material. The packing material of the invention has a low bulk density, is biodegradable and recyclable, and can be fabricated with recycled materials. This packing material has many of the advantages of polystyrene, but without polystyrene's disposal problems.

Figure 1:
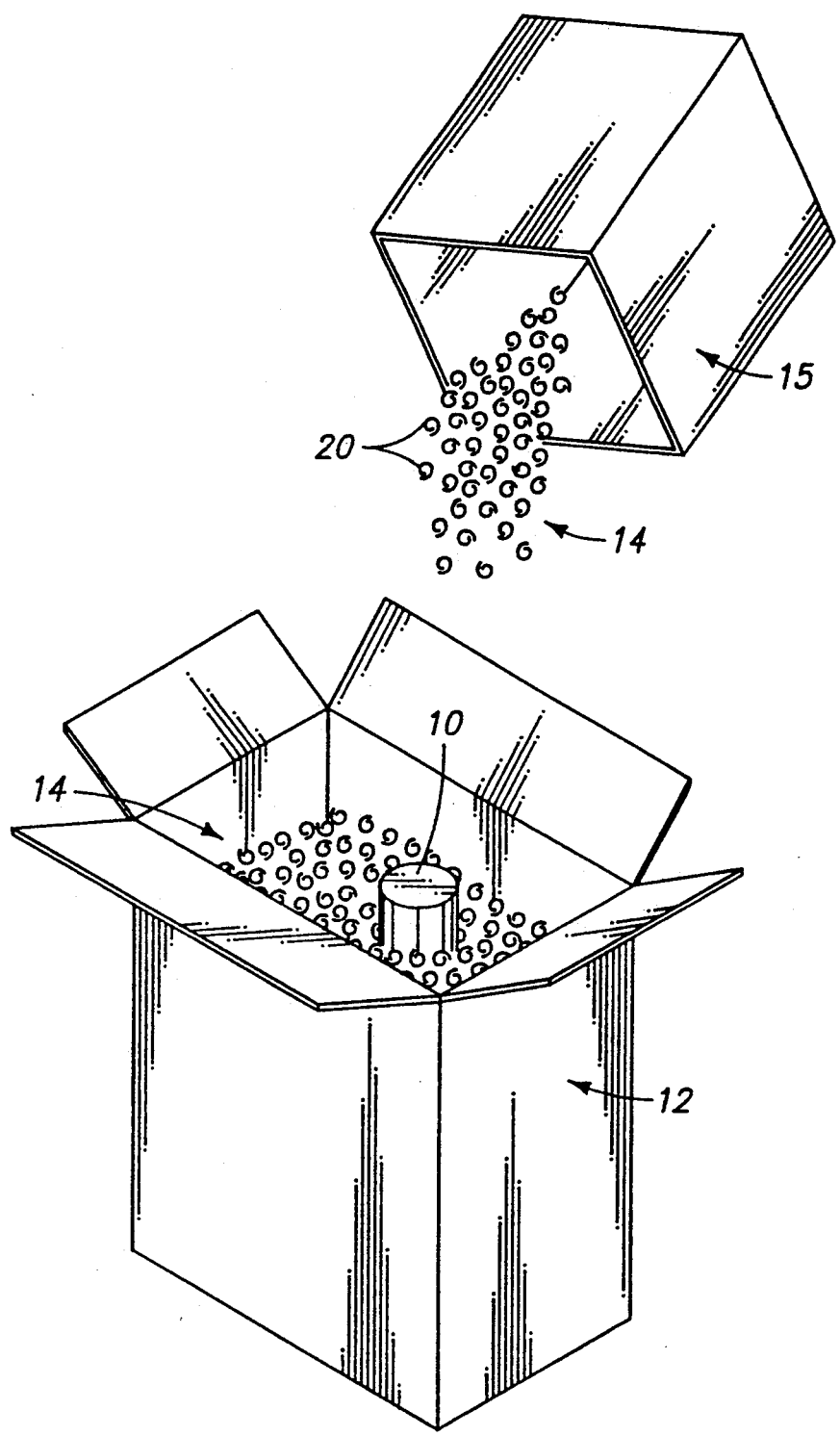
FIG. 1 is a perspective view of an object being packed with conventional loose-fill packing material in a container.

FIG. 1 shows an object 10 being packed within a packing container 12 by a conventional free-flowing loose-fill packing material 14. Packing material 14 comprises a plurality of individual packing elements, shown only generally in FIG. 1, which are poured from an overhead dispenser 15.

Figure 2:
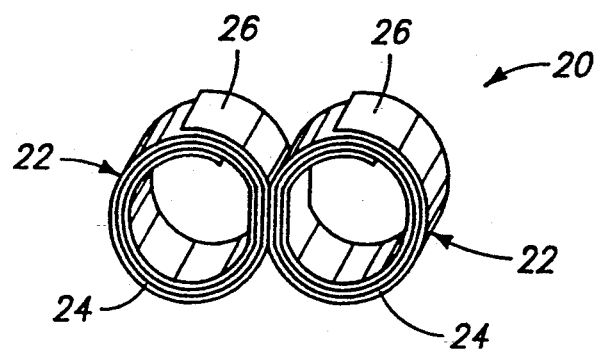
FIG. 2 is a perspective view of a preferred embodiment of an individual packing element in accordance with this invention.

FIG. 2 shows a single packing element 20 in accordance with a preferred embodiment of this invention. Packing element 20 comprises two paper rings 22. Each ring 22 is formed by a strip of paper 24 which is rolled lengthwise upon itself about a central axis to form a cylindrical outer surface 26. Each paper strip 24 has a strip of adhesive applied to at least one of its ends to prevent the strip from unrolling. Adhesive is preferably applied to both longitudinal ends of strip 24 to create a paper ring which defines a coreless, annular ring about the central axis.

Each paper ring 22 forms a hollow cylinder about the central axis, with a cylindrical wall formed by a number of cumulative wraps of paper strip 24. Each wrap is laterally aligned with and overlies the previous wrap to build up a desired wall thickness (exaggerated wall thickness is shown in the drawings for purposes of illustration). The rings each have a lateral width extending along the central axis.

The two paper rings 22 abut each other along their outer surfaces. A strip of adhesive applied along the abutment connects the rings together at their outer surfaces 26. The rings are preferably oriented with their central axes parallel to each other, so that the two rings form a figure eight.

In the embodiment shown, the longitudinal edges of paper strips 24 are cut straight. In an alternative embodiment, not shown, the edges are serrated. Serrated edges may in some cases reduce nesting of the packing elements.

While the preferred embodiments of the invention are constructed of newsprint paper, the paper rings could conceivably comprise any biodegradable paper-like material. Accordingly, the term "paper" is used in a broad sense to designate anything "resembling true paper in form and use or in composition." Webster's Third New International Dictionary of the English Language Unabridged. 30 lb. basis weight kraft paper has been found to be an acceptable, if somewhat less desirable, alternative to newsprint paper. Other types of paper-like material might also be acceptable.

Newsprint paper, however, is particularly attractive from an economical and environmental standpoint.

Newsprint paper is biodegradable and can thus be disposed of with comparatively little impact on the environment. It is also frequently available as recycled newspaper.

Tests have been conducted to verify the performance of packing elements such as packing element 20 and also to identify the optimum characteristics of such packing elements. Several types of paper were tested. In addition, the length of the paper strip, the diameter of the coreless ring, and the width of the ring were varied to determine optimum physical dimensions.

A sphere of about three inches diameter was surrounded by packing material within a corrugated container having side dimensions of about 6.25 inches. The container was overfilled by about 1.5 inches prior to closing. Accelerometers were placed within the sphere to measure acceleration in three coordinates.

A wood two-by-four about 3 feet long was pivotally suspended from above the container and allowed to fall from a nearly horizontal position in order to impact the container. Each of the six sides of the container was impacted in this manner four times.

Following this impacting, the container was mounted to a shaker and shaken for 20 minutes. The impacting was then repeated.

The acceleration of the sphere in g's within the packed sphere was measured during the impacting, both before and after the shaking.

Test 1 shows the results obtained with conventional expanded polystyrene. The remaining tests show results obtained with packing elements as shown in FIG. 2. In all cases, the width of the individual packing rings was ¾". Unless otherwise noted, the edges of the rings were cut straight. "Strip length" refers to the length of paper strip 24 before it is rolled.

|  | Before shaking | After shaking |
|---|---|---|
| TEST 1 | | |
| Expanded polystyrene | | |
| High value | 251.8 | 141.8 |
| Low value | 34.5 | 31.0 |
| Average value | 54.22 | 52.72 |
| Standard deviation | 42.53 | 23.43 |
| TEST 2 | | |
| Newsprint Paper, Ring diameter ¾", Strip length 12" | | |
| High value | 55.6 | 89.5 |
| Low value | 17.1 | 17.5 |
| Average value | 35.94 | 44.0 |
| Standard deviation | 9.16 | 23.92 |
| TEST 3 | | |
| Newspaper Paper, Ring diameter ⅝" | | |
| Strip length 8", Serrated Edges | | |
| High value | 47.1 | 63.9 |
| Low value | 17.4 | 19.0 |
| Average value | 31.6 | 29.48 |
| Standard deviation | 7.71 | 8.79 |
| TEST 4 | | |
| Kraft Paper, Ring diameter ⅝", Strip length 6" | | |
| High value | 55.4 | 190.0 |
| Low value | 21.8 | 21.8 |
| Average value | 33.34 | 43.95 |
| Standard deviation | 8.45 | 40.66 |
| TEST 5 | | |
| Newsprint Paper, Ring diameter ¾" | | |
| Strip length 12", Serrated edges | | |
| High value | 57.5 | 55.8 |
| Low value | 18.6 | 19.4 |
| Average value | 34.94 | 32.72 |
| Standard deviation | 9.98 | 9.91 |
| TEST 6 | | |
| Newsprint Paper, Ring diameter ⅝" | | |
| Strip length 12", Serrated Edges | | |
| -continued | | |
|  | Before shaking | After shaking |
| High value | 61.1 | 65.5 |
| Low value | 24.0 | 19.1 |
| Average value | 32.9 | 32.21 |
| Standard deviation | 8.98 | 10.29 |

As the test results show, newspaper provides better impact energy absorption and recovery than kraft paper. In this and subsequent testing the optimum paper ring diameter has been found to be in the range of about ⅜ inches to about 1 inch. The optimum length of each paper strip is in the range of about 6 inches to about 12 inches, depending on the diameter of the paper ring. Operable paper ring width is in the range of about ⅜ inches to about 2 inches.

The most preferable dimensions, especially when employed in combination, are in a paper strip having a length of about 8 inches, a ring diameter of about ⅝ inches, and a ring width of about ¾ inches. Packing elements having these dimensions and made from newsprint paper exhibit impact energy absorption characteristics superior to expanded polystyrene packing material. The packing elements provide good resistance to migration and remain loose during shaking without packing or "nesting" within each other. Performance does not degrade after repeated and extended impacting and shaking of the packing container.

FIGS. 3-7 illustrate the preferred methods of this invention. Such methods include rolling sheets 43 of paper to form elongated coreless paper rolls 56, attaching two such elongated paper rolls 56 together along their lengths, and cutting a plurality of packing elements 20 from elongated paper rolls 56 after they are attached to each other.

Figure 3:
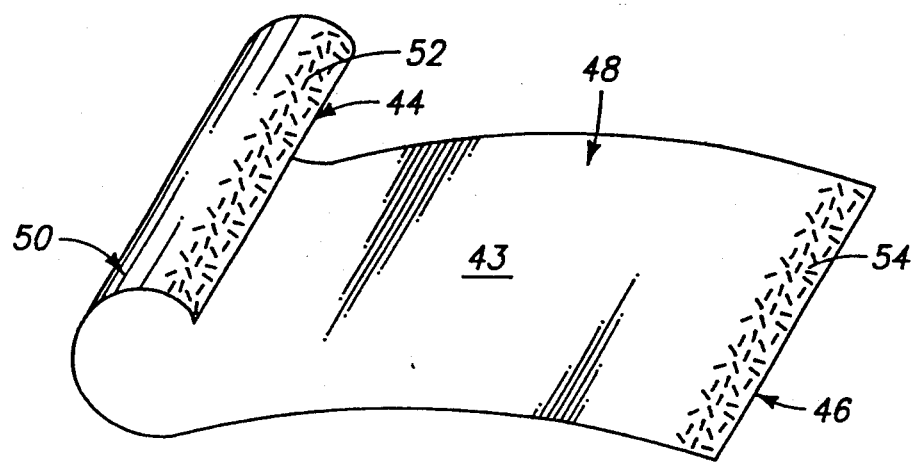
FIG. 3 is a perspective view showing an initial step in fabricating the packing element of FIG. 2 at an initial step of fabrication.

Referring to FIG. 3, a sheet of paper 43 has an inside end 44, an outside end 46, an inward surface 48, and an outward surface 50. A strip of adhesive 52 is applied to outward surface 50 of paper sheet 43 along the lateral width of its inside end 44. Another strip of adhesive 54 is applied to inward surface 48 of paper sheet 43 along the lateral width of its outside end 46. Adhesive strips 52 and 54 are applied before a subsequent rolling step to prevent paper sheet 43 from unrolling. Alternatively, adhesive strip 52 may be eliminated.

Figure 4:
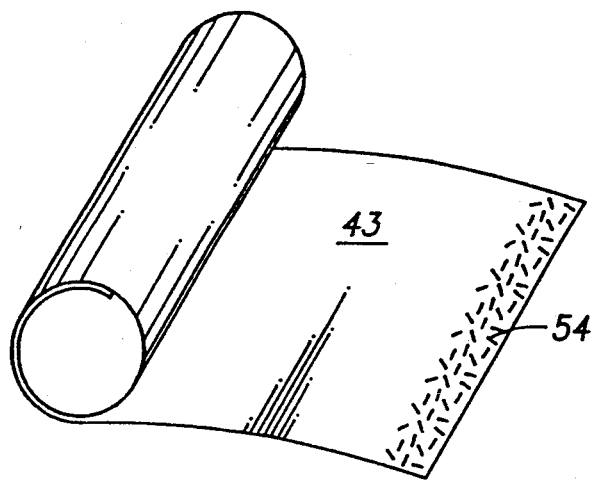
FIG. 4 is a perspective view showing a fabrication step subsequent to that shown in FIG. 3.
Figure 5:
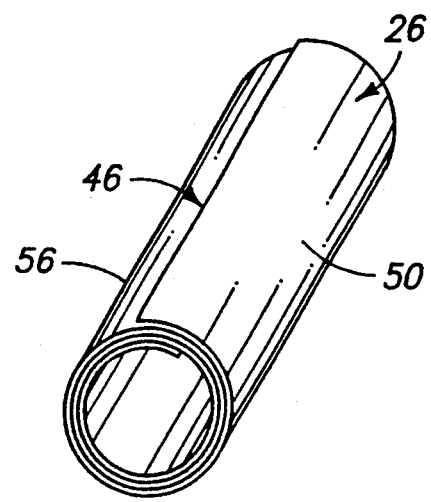
FIG. 5 is a perspective view showing a fabrication step subsequent to that shown in FIG. 4.

Paper sheet 43 is rolled as shown in FIGS. 4 and 5 to form an elongated coreless paper roll 56 with a cylindrical outer surface 26 formed by outward paper sheet surface 50. The rolling of paper sheet 43 can be accomplished by wrapping paper sheet 43 around an appropriately-sized platen or by use of a coreless roll winder.

Figure 6:
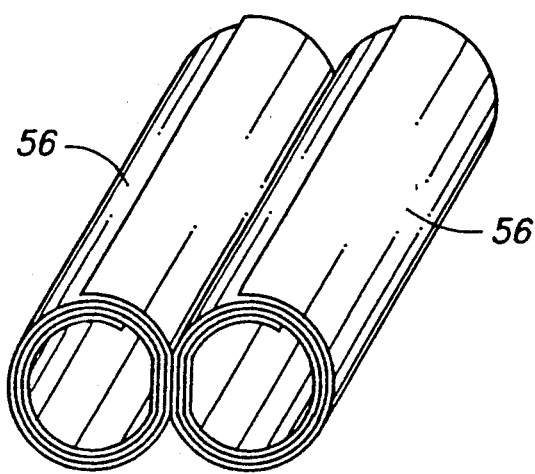
FIG. 6 is a perspective view showing a fabrication step subsequent to that shown in FIG. 5.
Figure 7:
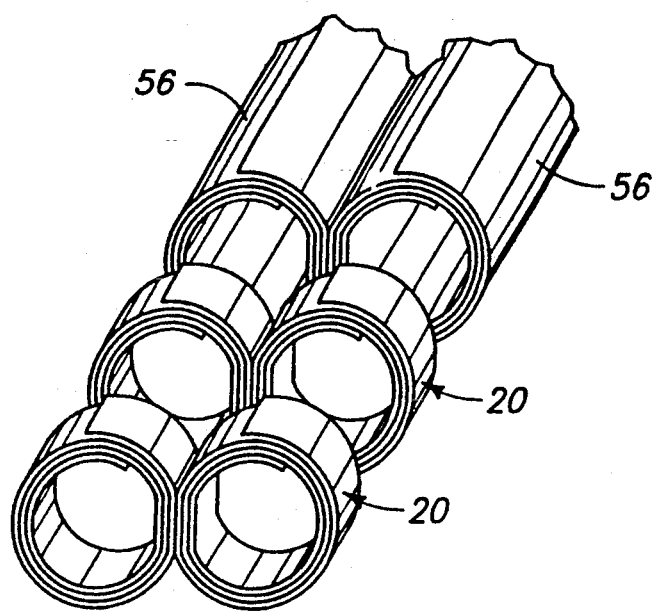
FIG. 7 is a perspective view showing a fabrication step subsequent to that shown in FIG. 6.

Two elongated paper rolls 56 are connected together at their outer surfaces along their lengths as shown in FIG. 6. The connection is accomplished by applying a strip of adhesive along the length of at least one of elongated paper rolls 56 and by then compressing elongated paper rolls 56 together against the strip of adhesive.

After connecting the two elongated paper rolls 56, individual packing elements 20 are cut to a desired lateral width from each attached pair of elongated paper rolls 56. Rotary knives, such as commonly used in the paper manufacturing industry, are used to cut the individual packing elements 20. In an alternative method a pinking knife is used to produce serrated edges.

Alternatively, a plurality of paper rings could be cut to the desired width from individual paper rolls 56, with pairs of such rings being then adhesively attached to each other. The rings could be attached so that their central axes are aligned in parallel, as shown in FIG. 2, or, if desired, with non-aligned central axes (not shown).

Figure 8:
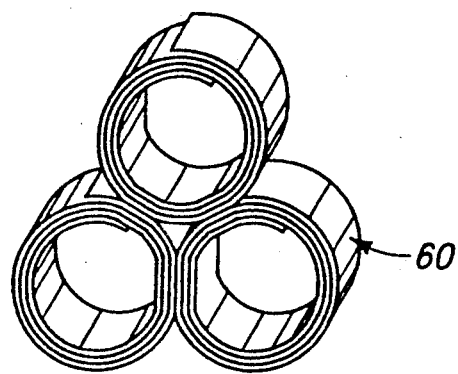
FIG. 8 is a perspective view of an alternative embodiment of a packing element in accordance with this invention.

FIG. 8 shows an alternative embodiment of a packing element in accordance with this invention, generally designated by the reference numeral 60. Packing element 60 is constructed similarly to packing element 20 of FIG. 2, except that three elongated paper rolls 56 are connected together to form a triangle shape before cutting individual packing elements 60.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A loose-fill packing material of low bulk density in which the packing material comprises a plurality of individual packing elements, each individual packing element comprising:
   two paper rings;
   each ring formed of a separate strip of paper which is rolled lengthwise upon itself about a central axis forming multilayers with a cylindrical outer surface; and
   connecting means interconnecting the two rings along their outer surfaces.

2. The packing material of claim 1, wherein each strip of paper has a strip of adhesive applied to at least one of its ends to prevent the strip from unrolling.

3. The packing material of claim 1, wherein:
   the paper rings abut each other along their outer surfaces; and
   the connecting means includes adhesive along the outer surfaces adhesively interconnecting the rings along their outer surfaces.

4. The packing material of claim 1, wherein each paper ring has a width in the range of about ⅜ inches to about 2 inches.

5. The packing material of claim 1, wherein each paper ring has a diameter in the range of about ⅜ inches to about 1 inch.

6. The packing material of claim 1, wherein each paper strip has a length in the range of about 6 inches to about 12 inches and a diameter in the range of about ⅜ inches to about 1 inch.

7. The packing material of claim 1, wherein each paper strip comprises a strip of newsprint paper.

8. The packing material of claim 1, wherein each paper strip comprises a strip of newsprint paper having a length of about 8 inches, each paper ring having a diameter of about ⅜ inches.

9. The packing material of claim 1, wherein the two paper rings of each packing element are oriented with their central axes parallel to each other.

10. A loose-fill packing material of low bulk density in which the packing material comprises a plurality of individual packing elements, each individual packing element comprising:
    two coreless paper rings;
    each ring including a separate strip of paper which is rolled lengthwise upon itself about a central axis forming a multilayer ring with cylindrical inner and outer surfaces;
    the coreless paper rings abutting each other along their outer surfaces; and
    adhesive along the outer surfaces securing the outer surfaces together to form the shape of a figure eight.

11. The packing material of claim 10, wherein each coreless paper ring has a width in the range of about ⅜ inches to about 2 inches.

12. The packing material of claim 10, wherein each coreless paper ring has a width of about ¾ inches.

13. The packing material of claim 10, wherein each coreless paper ring has a diameter in the range of about ⅜ inches to about 1 inch.

14. The packing material of claim 10, wherein each coreless paper ring has a diameter about ⅜ inches.

15. The packing material of claim 10, wherein each paper strip has a length in the range of about 6 inches to about 12 inches and a diameter in the range of about ⅜ inches to about 1 inch.

16. The packing material of claim 10, wherein each paper strip has a length of about 8 inches and each coreless paper ring has a diameter of about ⅜ inches.

17. The packing material of claim 10, wherein each paper strip comprises a strip of newsprint paper.

18. The packing material of claim 10, wherein each paper strip comprises a strip of newsprint paper having a length of about 8 inches, each coreless paper ring having a diameter of about ⅜ inches.

* * * * *